United States Patent [19]

Campos et al.

[11] Patent Number: 5,491,235
[45] Date of Patent: Feb. 13, 1996

[54] PROCESS FOR THE PREPARATION OF ORGANIC PIGMENTS

[75] Inventors: Margot Campos, Charleston; Dirk Pfuetzenreuter, Summerville; Guenter Franke; Michael J. Greene, both of Mt. Pleasant, all of S.C.

[73] Assignee: Bayer Corporation, Pittsburgh, Pa.

[21] Appl. No.: 239,180

[22] Filed: May 6, 1994

[51] Int. Cl.$^6$ ............... C09B 48/00; C07D 471/04
[52] U.S. Cl. ................. 546/57; 546/49; 546/56
[58] Field of Search ................. 546/49, 56, 57

[56] References Cited

U.S. PATENT DOCUMENTS

| | | | |
|---|---|---|---|
| 3,157,659 | 11/1964 | Deuschel et al. | 546/56 |
| 3,256,285 | 6/1966 | Fuchs et al. | 546/28 |
| 3,265,699 | 8/1966 | Jaffe | 546/49 |
| 3,317,539 | 5/1967 | Jaffe | 546/57 |
| 3,342,823 | 9/1967 | Dien | 546/49 |
| 3,738,988 | 6/1973 | Jackson | 546/49 |
| 4,100,162 | 7/1978 | North | 546/49 |
| 4,455,173 | 6/1984 | Jaffe | 106/495 |
| 4,758,665 | 7/1988 | Spietschka et al. | 546/49 |
| 4,844,742 | 7/1989 | Jaffe | 106/448 |
| 4,895,948 | 1/1990 | Jaffe et al. | 546/56 |
| 4,895,949 | 1/1990 | Jaffe et al. | 546/56 |

OTHER PUBLICATIONS

S. S. Labana and L. L. Labana, "Quinacridones, Chemical Reviews", vol. 67, 1–18 Jan. 25, 1967.

*Primary Examiner*—Alan L. Rotman
*Attorney, Agent, or Firm*—Joseph C. Gil; Richard E. L. Henderson

[57] ABSTRACT

This invention relates to a process for the preparation of quinacridone pigments comprising (a) heating, at a temperature of about 80° C. to about 145° C., a reaction mixture comprising
  (i) 2,5-dianilinoterephthalic acid or a 2,5-dianilinoterephthalic acid derivative having one or more substituents in at least one aniline ring,
  (ii) about 2 to about 10 parts by weight, relative to component (i), of a strong acid, and
  (iii) at least about 0.4 mole percent, relative to component (i), of iron in the form of an iron salt;

(b) drowning the reaction mixture from step (a) by adding said reaction mixture to about 3 to about 15 pads by weight, relative to component (i), of a liquid in which the pigment is substantially insoluble;

(c) isolating the quinacridone pigment; and (d) optionally, conditioning the quinacridone pigment.

14 Claims, No Drawings

PROCESS FOR THE PREPARATION OF ORGANIC PIGMENTS

BACKGROUND OF THE INVENTION

This invention relates to a process for the preparation of quinacridone pigments having reduced particle size and improved coloristic properties. In particular, the particle size of the typical unsubstituted quinacridone is reduced by about 30% by the addition of certain iron salts to the ring closure melt during pigment synthesis and before the drowning process. The resultant beta-phase quinacridones have characteristically deeper masstone, increased transparency, and bluer undedone (tint) hue.

Processes for the preparation of quinacridones are well known and documented. For example, S. S. Labana and L. L. Labana, "Quinacridones," *Chemical Reviews* 67, 1–18 (1967), and U.S. Pat. Nos. 3,157,659, 3,256,285, and 3,317,539. The quinacridones thus obtained, known as crude quinacridones, are generally unsuitable for use as pigments and must undergo one or more additional finishing steps to modify the particle size, particle shape, or crystal structure to achieve pigmentary quality.

A preferred method for preparing quinacridones involves thermally inducing ring closure of 2,5-dianilinoterephthalic acid intermediates, as well as known aniline-substituted derivatives thereof, in the presence of polyphosphoric acid, such as described in U.S. Pat. No. 3,257,405. After ring closure is completed, the melt is drowned by pouring into a liquid in which the quinacridone is substantially insoluble, usually water or an alcohol. The resultant crystalline pigment that is then further conditioned by solvent treatment or milling in combination with solvent treatment.

Final particle size of quinacridone pigments is controlled by the methods used both in synthesis and in aftertreatment. Quinacridone pigments can be made more transparent by reducing the particle size or more opaque by increasing the particle size. Particle size is most often controlled during precipitation of the pigment by drowning or during subsequent milling of the crude pigment. Tinctorial strength and transparency of pigments can also be affected by solvent treatment.

Quinacridones and quinacridone solid solutions disclosed in the prior art are also sensitive to numerous other process variables, such as the type of drowning solvent, the temperature of the drowning solvent, the type of agitation used during the drowning process, the duration of the drowning process, and the post-drown processes. These variables are known to affect crystal phase, particle size and distribution, and surface characteristics, all of which ultimately affect the pigment color properties such as transparency, hue, tinctorial strength, dispersibility, dispersion stability, and rheology.

It has now been found possible to obtain quinacridone pigments having smaller particle size without the need for milling processes or narrow, low-temperature ranges typically required in known processes. This result can be achieved by adding an iron salt during preparation of the pigments, particularly during the ring closure reaction. The process of the present invention is in principle applicable to all quinacridone pigment manufacturing processes that include an "acid pasting" step, but the greatest improvement in coloristic properties is observed with ring-closure processes, including processes used to prepare quinacridone solid solutions.

SUMMARY OF THE INVENTION

This invention relates to a process for the preparation of quinacridone pigments comprising (a) heating, at a temperature of about 80° C. to about 145° C. (preferably 100° C. to 130° C.) (preferably for about one to about 24 hours), a reaction mixture comprising
  (i) 2,5-dianilinoterephthalic acid or a 2,5-dianilinoterephthalic acid derivative having one or more substituents in at least one aniline ring,
  (ii) about 2 to about 10 parts by weight (preferably 3 to 8 parts by weight), relative to component (i), of a strong acid (preferably polyphosphoric acid), and
  (iii) at least about 0.4 mole percent (preferably 0.6 to 4.0 mole percent, more preferably 1.0 to 3.0 mole percent), relative to component (i), of iron in the form of an iron salt;

(b) drowning the reaction mixture from step (a) by adding said reaction mixture to about 3 to about 15 parts by weight (preferably 5 to 10 parts by weight), relative to component (i), of a liquid in which the pigment is substantially insoluble (preferably a $C_1$–$C_4$ aliphatic alcohol such as methanol in admixture with 0 to about 50% by weight of water);

(c) isolating the quinacridone pigment; and (d) optionally, conditioning the quinacridone pigment.

DETAILED DESCRIPTION OF THE INVENTION

Quinacridone pigments are prepared according to the invention by first ring-closing 2,5-dianilinoterephthalic acid intermediates, including known aniline-substituted derivatives thereof, by heating such terephthalic add intermediates in the presence of a strong acid (preferably polyphosphoric acid), and an iron salt. The quinacridone pigment is then drowned and isolated. The pigment is preferably also subjected to additional conditioning steps to improve pigmentary properties. The process of the invention can be used to prepare unsubstituted quinacridone or ring-substituted quinacridone derivatives, depending on whether the ring closure is carried out using 2,5-dianilinoterephthalic acid or derivatives thereof having one or more substituents in at least one of the two aniline rings. Although essentially any 2,5-dianilinoterephthalic acid derivatives known in the art can be used, particularly preferred 2,5-dianilinoterephthalic acid derivatives are those in which both aniline moieties are substituted (typically with the same substituent) in the para position with groups such as halogen (especially chlorine), $C_1$–$C_6$ alkyl (especially methyl), and $C_1$–$C_6$ alkoxy (especially methoxy). It is also possible to use 2,5-dianilinoterephthalic acid derivatives in which both aniline moieties are substituted in the ortho or meta positions. Examples of suitable 2,5-dianilinoterephthalic acid derivatives include 2,5-di(4-chloroanilino)terephthalic acid, 2,5-di(4-methylanilino)terephthalic acid, and 2,5-di(4-methoxyanilino)terephthalic acid.

Ring closure step (a) is carried out in a strong acid, such as polyphosphoric acid or acidic esters thereof (e.g., U.S. Pat. No. 4,758,665) or sulfuric acid. Polyphosphoric acid having a phosphate content equivalent to about 114–120% $H_3PO_4$ is particularly preferred. When using polyphosphoric acid, the weight ratio of polyphosphoric acid to terephthalic acid derivative is typically about 2:1 to about 10:1 (preferably 3:1 to 8:1). The lower ratios can give high viscosity reaction masses but are generally preferred because of cost considerations.

A critical feature of the present invention is the addition of an iron salt to the ring-closure reaction. Suitable salts include various known salts of iron(II) and iron(III), including the sulfates, nitrates, phosphates, and halides (especially chloride), as well as oxides and hydroxides. Preferred iron salts are at least partly soluble in the acidic reaction medium. It is also possible to use complexes of iron(II) or iron(III) in which the iron is covalently bonded (that is, "complexed") to various ligands known in the art. When iron complexes are used, it is generally preferred, although not essential, to use iron complexes that are stable under the acidic reaction conditions. When using a negatively charged ligand, the iron complex may even have an overall negative charge, such that a cationic rather than an anionic counterion must be present. Suitable iron complexes contain ligands such as water, halides (especially chloride), phosphates or polyphosphates, various polyhydroxyl compounds, β-diketones, and oxalate, and even ammonia, amines, or polyamines. In general, salts or hydrated salts are preferred. Hydrated iron(II) sulfates, particularly the heptahydrate, have been found to be particularly effective.

The commercial preparation of 2,5-dianilinoterephthalic acid can itself introduce as much as 0.1% by weight of iron but typically introduces less than 0.06% by weight of iron. However, the process of the present invention requires the addition of iron, in the form of iron salts, beyond the amount of iron already present in the 2,5-dianilinoterephthalic acid starting material to enhance the formation of quinacridone pigments having reduced particle size and improved coloristic properties. In particular, the process of the present invention requires a total iron content of at least 0.4 mole percent relative to the 2,5-dianilinoterephthalic acid, which corresponds to at least 0.6% by weight of iron when using unsubstituted 2,5-dianilinoterephthalic acid. Similarly, the preferred range of 0.6 to 4.0 mole percent of total iron corresponds to about 0.1 to about 0.6% by weight of iron. When using commercially available ferrous sulfate heptahydrate in the preparation of unsubstituted quinacridone, the preferred range of 0.6 to 4.0 mole percent iron corresponds to about 0.5 to about 3% by weight of the salt relative to unsubstituted 2,5-dianilinoterephthalic acid. Because high salt content is often detrimental to the quality of the finished good (for example, giving low color strength, poor dispersibility, and the like), the use of large amounts of iron is generally to be avoided.

The reaction mixture is heated at a temperature of about 80° C. to about 145° C. (preferably 100° C. to 130° C.), preferably for about 1 to about 24 hours (more preferably for one to ten hours).

After ring closure step (a) is completed, the quinacridone pigment is precipitated (i.e., "drowned") in step (b) by adding the strongly acidic melt to a liquid in which the pigment is substantially insoluble, preferably a water-miscible solvent such as methanol or other lower aliphatic alcohols in admixture with 0 to about 50% by weight of water. Although it is possible to add the drowning liquid to the acidic melt (e.g., U.S. Pat. No. 3,265,699), the present invention is carried out only by adding the acidic melt to the solvent (compare U.S. Pat. No. 4,100,162).

Suitable drowning liquids include water-miscible organic liquids such as lower aliphatic alcohols, such as methanol; ketones and ketone alcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred.

Drowning with $C_1$–$C_4$ aliphatic alcohols (preferably methanol) in admixture with up to about 50% by weight (preferably 10 to 25% by weight) of water is particularly preferred. In addition, solvents diluted with water in amounts approaching 50% by weight provides economic advantages. In contrast, drowning only with water or with alcohol mixtures containing more than about 50% by weight water can induce formation of undesirable amounts of the undesired alpha- and/or gamma-phase quinacridone pigments instead of beta-phase pigment.

The temperature of the drowning liquid is usually between about 5° C. and about 65° C., although temperature is less critical than in most known quinacridone processes. In general, lower drown temperatures give pigment having smaller the particle size. However, because process cycle time is also very important (because of the manufacturing cost), a shorter drowning time is preferred and can be achieved without excessive particle size growth by allowing the solvent temperature to reach 65° C. during the drowning process.

It is possible but less preferred to include a portion of the iron salt in the drown step.

The drowned pigment is then isolated in step (c) using methods known in the art, such as filtration, and then dried if desired. Other collection methods known in the art, such as centrifugation, are also suitable.

The crystalline pigment obtained in step (c) can be conditioned in optional step (d) using methods known in the art, such as solvent treatment or milling in combination with solvent treatment. Final particle size of the pigment can be controlled by varying the method of both synthesis and aftertreatment. For example, pigments can be made more transparent by reducing the particle size or more opaque by increasing the particle size. Particle size is most often controlled during precipitation of the pigment in the drowning liquid or during milling of the initially formed pigment.

Suitable milling methods include dry-milling methods such as sand-milling, ball-milling, and the like, with or without additives, or wet-milling methods such as salt-kneading, bead-milling, and the like in water or organic solvents, with or without additives.

Tinctorial strength and transparency of the pigment can also be affected by solvent treatment carried out by heating a dispersion of the pigment, often in the presence of additives, in a suitable solvent. Suitable solvents include organic solvents, such as alcohols, esters, ketones, and aliphatic and aromatic hydrocarbons and derivatives thereof, and inorganic solvents, such as water. Suitable additives include compositions that lessen or avoid flocculation, increase pigment dispersion stability, and reduce coating viscosity, such as polymeric dispersants (or surfactants) and various quinacridone derivatives. E.g., U.S. Pat. Nos. 4,455,173, 4,758,665, 4,844,742, 4,895,948, and 4,895,949.

Compared to previously known processes, pigments prepared according to the invention characteristically exhibit greater masstone chroma, greater transparency, and distinctly lower undertone (i.e., bluer) hue, all of which are highly desirable characteristics of quinacridone pigments, especially when used for automobile colorant applications.

Because of their light stability and migration properties, the quinacridone pigments prepared according to the present invention are suitable for many different pigment applications. For example, pigments prepared according to the invention can be used as the colorant (or as one of two or more colorants) for very fast pigmented systems, such as mixtures with other materials, pigment formulations, paints, printing ink, colored paper, or colored macromolecular materials. The term "mixture with other materials" can be understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the quinacridone pigments of the present invention can have any desired shape or form.

Pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Pigments prepared according to the Examples were analyzed by X-ray diffraction using a Siemens D-5000 Spectrometer. Data were collected under the following conditions:

| | |
|---|---|
| Power | 50 kV at 40 mA |
| Slits | 1.0 mm divergence |
| | 1.0 mm antiscatter |
| | 0.1 mm detector |
| Step size | 0.01° |
| Step time | 3 seconds |

Pigments prepared according to the Examples were also analyzed by transmission electron microscopy using a Zeiss EM 109 instrument. Data were collected under the following conditions:

Acceleration voltage: 80 kV

Magnification: 100,000×, 40,000×, and 1,000×

A rubout test was used for preliminary evaluation of color and appearance of the pigments. Dispersions were prepared on a Hoover Automatic Muller Model M4 (Hoover Color Corporation, Hiwassee, Virginia) fitted with two glass plates and one 50-lb (ca. 22.5-kg) weight. For the masstone dispersion, 200 mg of dry pigment was added to 240 mg of raw linseed oil (distributed by United Specialties of Amedca, Orlando, Fla.) and the mixture was placed on the bottom plate of the muller. After the upper plate was placed in contact with the lower plate, the bottom plate was allowed to turn for 50 revolutions. After the plates were separated, the paste on the upper plate was removed with a spatula and added to the bottom plate. This dispersion process was repeated three more times. The resultant paste was diluted with 480 mg of raw linseed oil and the muller dispersion process was repeated two times. A small amount of the resultant masstone dispersion was placed on a slide and evaluated in comparison with a comparison dispersion prepared by the same muller dispersion process.

The rubout test also included an undertone (tint) evaluation using 100 mg of the (final) masstone dispersion and 2.0 g of Zinc Oxide Bleach White W-3689 (Superior Printing Inks, New York, N.Y.). This mixing process was carried out using a spatula. The undertone was also compared to the comparison undertone dispersion.

Differences in hue and chroma of the masstone and undertone dispersions were measured using an Applied Color System Spectral Sensor (Hunt Associated Laboratories, Fairfax, Va.).

EXAMPLES 1–6

Synthesis procedures

Examples 1–6 describe the general procedure for the preparation of quinacridone by ring closure of the 2,5-dianilinoterephthalic acid intermediates, followed by aftertreatment of the crude pigment, to form pigmentan/quinacridone.

Examples 2 and 3 describe preparations of pigmentan/quinacridone according to the invention and Examples 1 and 4 describe comparison experiments. Example 5 describes the preparation of another pigmentan/quinacridone derivative according to the invention.

EXAMPLE 1 (comparison)

Example 1 is a comparison experiment carried out without iron being added to the reaction medium or water being added to the drowning liquid.

To 270 g of polyphosphoric acid (117.4% phosphoric acid) heated at 80°–95° C. was added 60 g (0.17 mole) of 2,5-dianilinoterephthalic add containing about 583 ppm (about 0.63 mmole) of iron. The iron content, relative to 2,5-dianilinoterephthalic acid, was less than 0.4 mole percent. The mixture was heated at 120°–125° C. for four hours. After the viscous solution was cooled to 90°–95° C., the acid strength was adjusted to 107% by the dropwise addition of 75% phosphoric acid (65 g). The resultant melt was stirred for 20 minutes and then slowly poured into 400 g of methanol at 35° C. The temperature of the resultant slurry was allowed to rise during the addition to about 64° C., with the temperature being controlled during addition by external cooling and adjustment of melt addition rate. The slurry was heated at reflux (68°–72° C.) for one hour and diluted with 600 g of water. After the resultant slurry was stirred for 30 minutes, the solid component was collected by filtration and washed with water until acid-free. The resultant presscake was reslurried in 1000 g of water and 5 g of 50% sodium hydroxide, then heated for 85° C. for two hours. After being cooled to 60° C., the slurry was filtered and washed with water until free of alkali. After the presscake was reslurried in 800 g water, a solution containing 37 g of water, 1.6 g of 50% sodium hydroxide, and 3.15 g of naphthenic acid was added. The resultant slurry was heated to 140°–145° C. for two hours in a closed system (e.g., a pressure reactor). After cooling the slurry to 60°–70° C., the pH was adjusted to 4.5–5.0 with phosphoric acid, stirred for one hour, collected by filtration, and washed with water. The wet cake can be oven dried or used as is for specific applications. Here, the wet cake was dried in an oven at 60° C. to give about 50 g of quinacridone as a brilliant violet solid.

EXAMPLE 2

Pigmentary quinacridone was prepared according to the invention with iron being added to the reaction medium and water being added to the drowning liquid.

To 270 g of polyphosphoric acid (117.4% phosphoric acid) heated at 80°–95° C. was added 0.75 g (2.7 mmole) of ferrous sulfate heptahydrate followed by 60 g (0.17 mole) of 2,5-dianilinoterephthalic acid containing about 583 ppm (about 0.63 mmole) of iron. The total iron content, relative to 2,5-dianilinoterephthalic acid, was about 1.9 mole percent. The mixture was heated at 120°–125° C. for four hours. After the viscous solution was cooled to 90°–95° C., the acid strength was adjusted to 107% by the dropwise addition of 75% phosphoric acid (65 g). The resultant melt was stirred for 20 minutes and then slowly poured into a mixture of 360 g of methanol and 40 g of water at 35° C. The temperature of the resultant slurry was allowed to rise during the addition to about 64° C., with the temperature being controlled during addition by external cooling and adjustment of melt addition rate. The slurry was heated at reflux (68°–72° C.) for one hour and diluted with 600 g of water. After the slurry was stirred for 30 minutes, the solid component was collected by filtration and washed with water until acid-free. The resultant presscake was reslurried in 1000 g of water and 5 g of 50% sodium hydroxide, then heated for 85° C. for two hours. After being cooled to 60° C., the slurry was filtered and washed with water until free of alkali. After the presscake was reslurried in 800 g water, a solution containing 37 g of water, 1.6 g of 50% sodium hydroxide, and 3.15 g of naphthenic acid was added. The slurry was heated to 140°–145° C. for two hours in a closed system (e.g., a pressure reactor). After the slurry was cooled to 60°–70° C., the pH was adjusted to 4.5–5.0 with phosphoric acid, stirred for one hour, collected by filtration, and washed with water. The wet cake can be oven dried or used as is for specific applications. Here, the wet cake was dried in an oven at 60° C. to give about 50 g of quinacridone as a brilliant violet solid.

The particle size of the pigment of Example 2 was smaller than the particle size of the pigment of comparison Example 1, as determined by transmission electron microscopy and X-ray analysis. X-ray data (full widths at half-maximum for peak at diffraction angle 2θ of 11.7 (arbitrary units)):

| Example 1 (comparison): | 0.545 |
| Example 2 | 0.687 |

Based on a rub-out test in linseed oil (as described above), the pigment of Example 2 exhibited the following coloristic values relative to the comparison pigment of Example 1:

| Masstone ΔC: | −1.11 (chroma) |
| Undertone ΔH: | −0.96 (hue) |
| Undertone % strength: | 108.0% |

That is, the pigment of Example 2 is significantly bluer in undertone (tint) and deeper in masstone than the comparison pigment of Example 1.

EXAMPLE 3

Pigmentary quinacridone was prepared according to the invention with iron being added to the reaction medium but without water being added to the drowning liquid.

To 270 g of polyphosphoric acid (117.4% phosphoric acid) heated at 80°–95° C. was added 0.75 g (2.7 mmole) of ferrous sulfate heptahydrate followed by 60 g (0.17 mole) of 2,5-dianilinoterephthalic acid containing about 583 ppm (about 0.63 mmole) of iron. The total iron content, relative to 2,5-dianilinoterephthalic acid, was about 1.9 mole percent. The mixture was heated at 120°–125° C. for four hours. After the viscous solution was cooled to 90°–95° C., the acid strength was adjusted to 107% by the dropwise addition of 75% phosphoric acid (65 g). The resultant melt was stirred for 20 minutes and then slowly poured into 400 g of methanol at 35° C. The temperature of the resultant slurry was allowed to rise during the addition to about 64° C., with the temperature being controlled during addition by external cooling and adjustment of melt addition rate. The slurry was heated at reflux (68°–72° C.) for one hour and diluted with 600 g of water. After the slurry was stirred for 30 minutes, the solid component was collected by filtration and washed with water until acid-free. The resultant presscake was reslurried in 1000 g of water and 5 g of 50% sodium hydroxide, then heated for 85° C. for two hours. After being cooled to 60° C., the slurry was filtered and washed with water until free of alkali. After the presscake was reslurried in 800 g water, a solution containing 37 g of water, 1.6 g of 50% sodium hydroxide, and 3.15 g of naphthenic acid was added. The resultant slurry was heated to 140°–145° C. for two hours in a closed system (e.g., a pressure reactor). After cooling the slurry to 60°–70° C., the pH was adjusted to 4.5–5.0 with phosphoric acid, stirred for one hour, collected by filtration, and washed with water. The wet cake can be oven dried or used as is for specific applications. Here, the wet cake was dried in an oven at 60° C. to give about 50 g of quinacridone as a brilliant violet solid.

Based on a rub-out test in linseed oil (as described above), the pigment of Example 3 exhibited the following coloristic values relative to the comparison pigment of Example 1:

| Masstone ΔC: | −1.93 (chroma) |
| Undertone ΔH: | −0.20 (hue) |
| Undertone % strength: | 104.4% |

That is, the pigment of Example 3 is slightly bluer in undertone (tint) and deeper in masstone than the comparison pigment of Example 1.

Similar experiments carried out using about 0.8 and about 2.8 mole percent total iron content provided pigment samples exhibiting comparable color properties, whereas an experiment carded out using about 4.1 mole percent total iron provided pigment exhibiting weaker color development.

EXAMPLE 4 (comparison)

Example 4 is a comparison experiment carried out without iron being added to the reaction medium but with water being added to the drowning liquid.

To 270 g of polyphosphoric acid (117.4% phosphoric acid) heated at 80°–95° C. was added 60 g (0.17 mole) of 2,5-dianilinoterephthalic acid containing about 583 ppm (about 0.63 mmole) of iron. The iron content, relative to 2,5-dianilinoterephthalic acid, was less than 0.4 mole percent. The mixture was heated at 120°–125° C. for four hours. After the viscous solution was cooled to 90°–95° C., the acid strength was adjusted to 107% by the dropwise addition of 75% phosphoric acid (65 g). The resultant melt was stirred for 20 minutes and then slowly poured into a mixture of 60 g of methanol and 40 g of water at 35° C. The temperature of the resultant slurry was allowed to rise during the addition to about 64° C., with the temperature being controlled during addition by external cooling and adjustment of melt addition rate. The slurry was heated at reflux (68°–72° C.) for one hour and diluted with 600 g of water. After the slurry was stirred for 30 minutes, the solid component was collected by filtration and washed with water until acid-free. The resultant presscake was reslurried in 1000 g of water and 5 g of 50% sodium hydroxide, then heated for 85° C. for two hours. After being cooled to 60° C., the slurry was filtered and washed with water until free of alkali. After the presscake was reslurried in 800 g water, a solution containing 37 g of water, 1.6 g of 50% sodium hydroxide, and 3.15 g of naphthenic acid was added. The slurry was heated to 140°–145° C. for two hours in a closed system (e.g., a pressure reactor). After the slurry was cooled to 60°–70° C., the pH was adjusted to 4.5–5.0 with phosphoric acid, stirred for one hour, collected by filtration, and washed with water. The wet cake can be oven dried or used as is for specific applications. Here, the wet cake was dried in an oven at 60° C. to give about 50 g of quinacridone as a brilliant violet solid.

Based on a rub-out test in linseed oil (as described above), the pigment of Example 4 exhibited the following coloristic values relative to the comparison pigment of Example 1:

| Masstone ΔC: | 1.21 (chroma) |
| Undertone ΔH: | –0.42 (hue) |
| Undertone % strength: | 100.2% |

That is, the comparison pigment of Example 4 is bluer in undertone (tint) but noticeably lighter in masstone than the comparison pigment of Example 1.

EXAMPLE 5

To 320 g of polyphosphoric acid (111.8% phosphoric acid) heated at 80°–95° C. was added 0.89 g (3.2 mmole) of ferrous sulfate heptahydrate followed by 72 g (0.1915 mole) of essentially iron-free 2,5-di(4-methylanilino)terephthalic acid. The iron content, relative to 2,5-di(4-methylanilino)terephthalic acid, was about 1.7 mole percent. The mixture was heated at 120°–125° C. for two hours. The viscous solution was cooled to 90°–95° C. and then slowly poured into a mixture of 470 g of methanol and 50 g of water at 40° C. The temperature of the resultant slurry was allowed to rise during the addition to about 64° C., with the temperature being controlled during addition by external cooling and adjustment of melt addition rate. The slurry was heated at reflux (68°–72° C.) for one hour, cooled to 60° C., and diluted with 600 g of water. After the slurry was stirred at 60° C. for 30 minutes, the solid component was collected by filtration and washed with water until acid-free. The resultant presscake was reslurried in 800 g of water and 33 g of 50% sodium hydroxide, then heated for 90°–95° C. for two hours. After being cooled to 70° C., the slurry was filtered and washed with water until free of alkali. The resultant presscake was reslurried in 700 g water and heated to 110°–115° C. for two hours in a closed system (e.g., a pressure reactor). After the slurry was cooled to 60°–70° C., the pH was adjusted to 3.5 with phosphoric acid and an emulsion of 2.5 g of sodium dioctyl sulfosuccinate (available as AEROSOL OT from American Cyanamid Co.), 35 g of VM&P Naphtha (available from Unocal Chemicals), and 75 g of water was added. The mixture was stirred at 30°–35° C. for three hours, collected by filtration, and washed with water. The wet cake can be oven dried or used as is for specific applications. Here, the wet cake was dried in an oven at 60° C. to give about 55 g of 2,9-dimethylquinacridone as a brilliant magenta solid. Based on a rub-out test in linseed oil (as described above), the pigment of Example 5 is significantly bluer in undertone (tint) and deeper in masstone than a comparison pigment that did not contain an iron salt in the ring closure melt or water in the drown solvent.

EXAMPLES 6–8

Applications

Examples 6–8 describe the preparation of various pigmented materials containing the pigment of Example 2 of the invention.

EXAMPLE 6

Preparation of enamel paints

A finely divided 8 g sample of the pigment of Example 2 was dispersed in 92 g of a stoving enamel having the following composition:

| 33% | alkyd resin (e.g., AROPLAZ ® 1453-X-50 alkyd resin, Reichhold Chemicals, Inc., White Plains, New York) |
| 15% | melamine resin (e.g., RESIMENE ® BM-7507 melamine resin, Monsanto Company, St. Louis, Missouri) |
| 5% | glycol monomethyl ester |
| 34% | xylene |
| 13% | butanol |

Upon completion of the dispersion the pigmented paint was applied to metal foils and then baked at 130° C. for 30 minutes. The resultant violet coatings were very fast to light and weathering, had good over-lacquering fastness, and had excellent rheological properties.

Other suitable alkyd resins are products based on synthetic or vegetable fatty acids, such as coconut oil, castor oil, linseed oil or the like. Urea resins can be used instead of melamine resins.

EXAMPLE 7

Preparation of thermoplastic moldings

A 0.2 g sample of the pigment of Example 2 was dispersed in 65 g of stabilized polyvinyl chloride and 35 g of diisooctyl phthalate at 160° C. in a mixing mill. A violet film having very good light and migration fastness was obtained.

Synthetic polyamides of caprolactam or of adipic add and hexamethylenediamine or the polyester condensates of terephthalic acid and ethylene glycol can be colored in a similar manner at 280°–300° C. (in an atmosphere of nitrogen where necessary).

EXAMPLE 8

Preparation of metallic paints

A mixture of 6 g of the pigment of Example 2 in 12 g of xylene, 4.1 g of butyl acetate, 0.7 g of butanol, and 22.5 g of a 20% solution of cellulose acetobutyrate in 2:1 butyl acetate/xylene was dispersed by agitating for 30 minutes in a shaker containing 2 to 3 mm diameter glass beads. To this dispersion was then added 10 g of a saturated polyester resin (available as DYNAPOL® H 700 from Hüls America), 7.3 g of melamine resin, 8.7 g of a 20% solution of cellulose acetobutyrate in 2:1 butyl acetate/xylene, 18 g of butyl acetate, 1.6 g of butanol, and 9.7 g of xylene and shaking was continued for another 5 minutes.

Metallic paints were then prepared by adding a dispersion of aluminum paste (60% solids; available as SPARKLE SILVER® AR from Silbedine Manufacturing Co., Inc.) in xylene (about 1:2)in amounts such that the ratio of pigment to aluminum was between about 80:12 and 1:99.

These metallic paints were applied to panels and after drying were coated with a clearcoat based on an acrylate/melamine resin (which can contain additional additives, such as ultraviolet absorbers). The resulting brilliant metallic violet paint exhibited good light and weather fastness and good rheological properties.

What is claimed is:

1. A process for the preparation of quinacridone pigments comprising
   (a) heating, at a temperature of 80° C. to 145° C., a reaction mixture comprising
       (i) 2,5-dianilinoterephthalic acid or a 2,5-dianilinoterephthalic acid derivative having one or more substituents in at least one aniline ring,
       (ii) 2 to 10 pads by weight, relative to component (i), of a strong acid, and
       (iii) at least 0.4 mole percent, relative to component (i), of iron in the form of an iron salt;
   (b) drowning the reaction mixture from step (a) by adding said reaction mixture to 3 to 15 pads by weight, relative to component (i), of a liquid in which the pigment is substantially insoluble;
   (c) isolating the quinacridone pigment; and
   (d) optionally, conditioning the quinacridone pigment.

2. A process according to claim 1 wherein the reaction mixture is heated at a temperature of 100° C. to 130° C.

3. A process according to claim 2 wherein the reaction mixture is heated for one to 24 hours.

4. A process according to claim 1 wherein 3 to 8 pads by weight, relative to component (i), of a strong acid is used.

5. A process according to claim 1 wherein the strong acid is polyphosphoric acid.

6. A process according to claim 1 wherein 0.6 to 4.0 mole percent, relative to component (i), of iron in the form of an iron salt is used.

7. A process according to claim 1 wherein 1.0 to 3.0 mole percent, relative to component (i), of iron in the form of an iron salt is used.

8. A process according to claim 1 wherein the iron salt is iron(II) sulfate or a hydrate thereof.

9. A process according to claim 1 wherein the reaction mixture from step (a) is drowned by adding said reaction mixture to a $C_1$–$C_4$ aliphatic alcohol in admixture with 0 to 50% by weight of water.

10. A process according to claim 9 wherein the $C_1$–$C_4$ aliphatic alcohol is methanol.

11. A process according to claim 9 wherein 10 to 25% by weight of water is used.

12. A process according to claim 1 wherein component (i) of step (a) is 2,5-dianilinoterephthalic acid or a 2,5-dianilinoterephthalic acid derivative in which at least one aniline ring has one or more substituents selected from the group consisting of halogen, $C_1$–$C_6$ alkyl, $C_1$–$C_6$ alkoxy, and combinations thereof.

13. A process according to claim 1 wherein the quinacridone pigment is isolated in step (c) by filtration or centrifugation.

14. A process according to claim 1 wherein the quinacridone pigment is conditioned in step (d) by solvent treatment or by milling in combination with solvent treatment.

* * * * *